United States Patent [19]

Hartmann

[11] 4,122,145

[45] Oct. 24, 1978

[54] PROCESS AND APPARATUS FOR THE PRODUCTION OF ELONGATED STRUCTURES

[76] Inventor: Werner Hartmann, Spiegelberg 1, 7759 Immenstaad, Germany

[21] Appl. No.: 760,923

[22] Filed: Jan. 21, 1977

[30] Foreign Application Priority Data

Jan. 22, 1976 [DE] Fed. Rep. of Germany ....... 2602312

[51] Int. Cl.$^2$ ............................................... B29F 3/10
[52] U.S. Cl. .................................... 264/174; 264/236; 264/329; 264/331; 264/349; 425/113; 425/114; 427/117; 427/120
[58] Field of Search ............... 264/174, 171, 349, 331, 264/329, 134, 236, DIG. 56; 260/78 L; 427/117, 120; 425/113, 114

[56] References Cited

U.S. PATENT DOCUMENTS

| | | | |
|---|---|---|---|
| 2,669,754 | 2/1954 | Chadbourne | 264/174 |
| 3,044,993 | 7/1962 | Tiemersma | 260/78 L |
| 3,301,932 | 1/1967 | Chisholm | 264/174 |
| 3,404,433 | 10/1968 | Krutchen et al. | 425/114 |
| 3,494,999 | 2/1970 | Heckrotte | 264/349 |
| 3,525,719 | 8/1970 | Schwarz | 260/78 L |
| 3,565,866 | 2/1971 | Guenther et al. | 260/78 L |
| 3,635,901 | 1/1972 | Urgesi et al. | 260/78 L |
| 3,644,296 | 2/1972 | Bosch | 260/78 L |
| 3,752,623 | 8/1973 | Sinn et al. | 260/78 L |

*Primary Examiner*—Jeffery R. Thurlow
*Attorney, Agent, or Firm*—Bruce K. Thomas

[57] ABSTRACT

A method and apparatus for continuously coating a thread or core with a thermoplastic is disclosed wherein a flowing stream of the plastic, in the form of a melt or liquid monomer is used to convey the core from one or more elongated and heated guide tubes into and through one or more elongated and cooled molding tubes axially aligned with each guide tube whereby the thread or core is automatically centered in the tubes and a uniform outer coating of hardened plastic is applied. The liquid monomer can be treated with a suitable activator or catalyst before entry into the mold tubes or at an intermediate mixing zone located between the exit part of the guide tubes and the inlet part of the cooling tubes. The mixing zone is larger in volume than the tubes and provides an off-center convolution about the exit ports of the guide tubes and coaxial conical exit ports converging into the entry ports of the molding tubes.

10 Claims, 2 Drawing Figures

PROCESS AND APPARATUS FOR THE PRODUCTION OF ELONGATED STRUCTURES

The invention relates to a process and an apparatus for the continuous production of elongated structures by use of tubular, axially aligned molds in which the flow of liquid plastic carries and centers the reinforcing filaments, for example threads, wire or hemp, which are thereby coated with the plastic, this outer coating taking place in molds.

BACKGROUND OF THE INVENTION

Monofilament threads were hitherto produced in the prior art by employing a spinning process or or in the pressure nozzle process. It is not possible using the prior art processes to introduce reinforcing cores into the monofilament threads which have the required stabilizing factors and which show no effect with respect to the cold flow of the plastic. Fish nets, for example, were hitherto woven from monomers containing a polyamide group as monofilament nylon threads. Such nets must be used in fishing grounds the waters of which are at extremely low temperatures, where the plastic, however, is disadvantageous in that it thereby becomes brittle.

Furthermore, ship's cables with a diameter between 200 and about 650 mm are made from hemp. These hemp threads, however, are subject to rotting because of their exposed condition and have to be renewed about annually.

If it is desired, with the use of molds, to coat cores with plastic, this cannot be successfully accomplished in the case of thin threads and also it is not possible to achieve this coating of the cores continuously.

SUMMARY OF THE INVENTION

It is the object of the invention to provide both a process and an apparatus which make it possible to continuously coat reinforcing cores that are very thin with plastic in order to produce fish nets, ship's cables and the like.

The solution of the problem according to the invention comprises conducting the process in such a way and with such materials, for example a plastic that is an activated poly-laurin lactam wherein the addition, of the activator and catalyst takes place in a mixing chamber with this mixing of liquid streams lying in flow direction directly ahead of the mold. Also the cores to be coated are introduced into the mixing chamber, and are carried along by the activated highly fluid poly-laurin lactam as it flows continuously into the mold during the final coating of the core, in which process the hardening takes place inside the mold.

In this process an entirely new route is taken. There is used a plastic that is extremely fluid and hardens relatively rapidly. This highly fluid plastic, because of its flow velocity and the resulting friction between the surface of the core and the plastic, carries this core along from the guide tubes into the mold in flow direction, i.e., the centering takes place to a certain extent automatically, since the flow pressure inside the mold provides that the core automatically has equal spacing from the walls of the mold. As hardening of the activated lactam occurs inside the mold, the entire process proceeds continuously, for the emerging string having a coated leaves the mold at such a velocity that the core remains centered while still inside the mold, and because the hardening takes place inside the mold.

For the conducting of the process it is essential that carbon dioxide is used as the catalyst and with this the melt of the polymer lactam is saturated. The activator is a phenyl isocyanate.

It is further essential that the catalyst and activator is added to separate liquid amounts of poly-laurin lactam.

In order to achieve the hardening already inside the mold, it is important that the temperature of the form or mold amount to approximately one-half the melt temperature of the poly-laurin lactam.

A preferred apparatus for the practice of the process consists in that the mixing chamber has a mixing tool, for example, a turbo-agitator and is formed without undercuts for the agitating stream.

This formation is important so that the core to be introduced simultaneously into the mixing chamber can center itself inside the tubular mold only on the basis of the flow relations of the liquid.

It is further expedient that the molds for the threads be removable centrally arranged pipes.

Further it is important that the mixing chamber is situated between the molds for the threads and feed pipes for cores which are allocated to the threads.

It is especially advantages in respect to the flow relations that the mixing chamber is approximately heart-shaped in its longitudinal section.

The cores are, for example, wire, steel wire or hemp. The resiliency in the monofiles produced according to the invention lies at 80%. Activated lactam monomer is as fluid as water in its main phase. The short pot time works out principally very favorably with the effect that in the driving of a thread the length of the guide sleeve can be relatively short until the material has hardened. Simultaneously, the production speed can be correspondingly increased because of the short pot time. In conventional processes after the thread production proper very long follow-up arrangements must be used. Furthermore, each thread in an end phase, therefore after the extruding, still had to be stretched in order to limit its end position. This, too, is eliminated.

A continuous thread production is assured over pumps which operate uniformly over the entire monofile course. The pressure in the entirely installation is very low and lies below 0.5 gauge atmospheres. The production process, therefore, can be designated as pressureless.

A block-off member is provided ahead of the pumps in running direction of the discharge. The correct temperature of the thread lies at 160° C. The temperature of the entire installation amounts, up to the mixing chamber, likewise about 160° C. In the mold part this temperature materializes to half the working temperature (measured over 0° C.). The temperature in the guide head of the installation has to be reduced, since otherwise heat accumulation occurs during the continuous manufacture of the elongated plastic parts.

Of the two possibilities, namely, supplying the activator and catalyst either in the mixing chamber or supply these ingredients in separate streams, the latter possibility is preferred, because then simultaneously with activator and catalyst becoming effective the molding process begins. A shorter time for the activator and catalyst to become active is thereby needed. Precisely these times are important, because the pot time is to be kept short. The separate mixing streams mentioned have proved necessary in tests, because otherwise a certain starting time of the catalyst or activator must occur in the plastic melt. This time point lies between 15 and 30 minutes. The activators and catalysts used are so-called contact activators or catalysts, which must reach a certain gasification time in the presence of heat. This gas must be drawn off, so that only the liquid substance carries in itself the effectiveness of the compound.

As guide head of the turbo-mixer there is preferred a so-called uncercut turbo agitator, which, therefore, has a disk form with a rear bevel of about 15°. This angle lies in the direction toward the so-called trimming of the mixing chamber, as will be explained still in more detail further below.

The mixing chamber is to be constructed in such a way that in the agitating process or in the use of the turbo-agitator in flow direction at the rear there are present fully rounded and smooth surfaces, so that from the turbulent action of the turbo-agitator in the end zone of the mixing chamber there arises a material contact. For the mixing chamber, therefore, there is preferred a heart shape, whereby the calming effect (momentary reduction in forward velocity) sought is achieved. Further preferred features of the present invention are to be found in the appended claims.

DESCRIPTION OF THE DRAWINGS

The invention is explained in more detail in the drawings with the aid of examples further important features will become apparent, and wherein.

DESCRIPTION OF THE PREFERRED EMBODIMENTS

Figure 1:
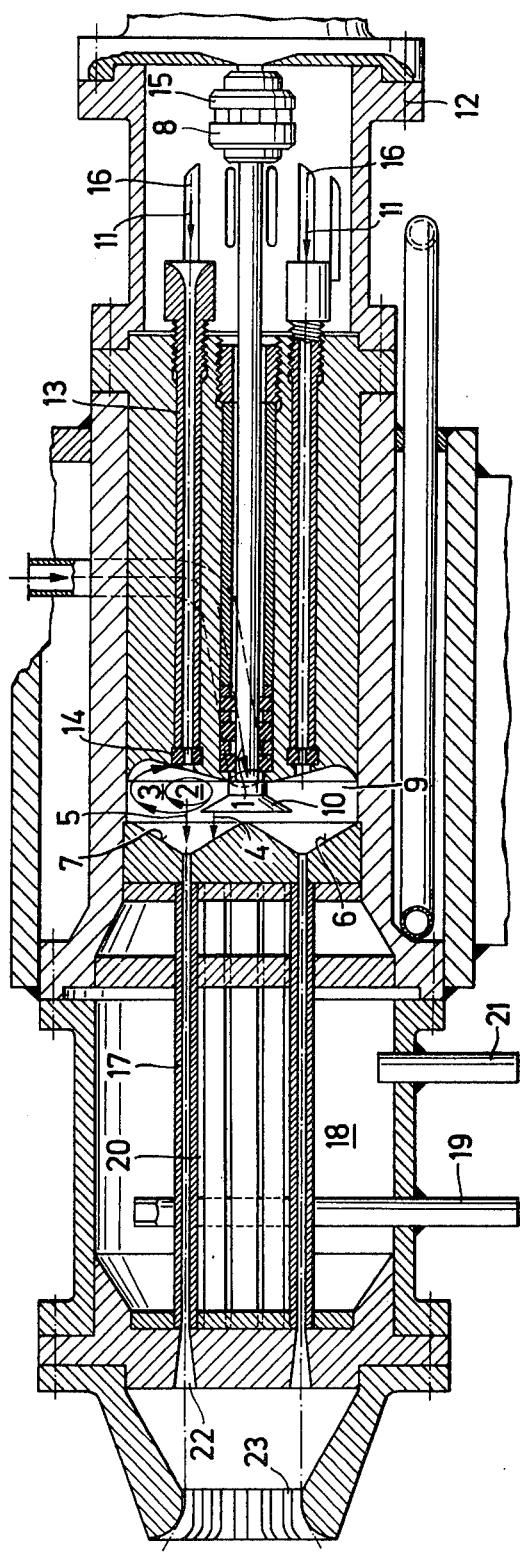
FIG. 1 is a partial cross-sectional view taken along the length of one form of the apparatus for the production of threads or strands of plastic having a central core, in accordance with this invention.

Referring to FIG. 1, the materials to be mixed, namely the new liquid plastic, activators and/or catalysts pass in the direction of arrow 1 into a mixing chamber 9, the rear part of which, as is evident from FIG. 1, has approximately the shape of a heart, being defined by concavities in the rear wall and a concavity or bevel 6 and 7 for each of the guide tubes or rods 13 in the forward wall. The materials in the mixing chamber are subjected to a mixing circulation which runs in the direction of the arrow 2. The materials then flow onward at lower velocity and outwardly through the heart shape of this chamber in the direction of the arrow 3 and build up at still lower velocity in front of a mixing disk 10 of a turbo-mixer. Thereby the materials passing in the direction of the arrow and are 4 are completely calmed and ultimately pass in the direction of the arrow 5 and are dispensed into the bores of the molds that are essentially aligned with the bases of the tubes 13. The mixing chamber is bounded forward by bevels 6, 7, whereby a turbulence formation is avoided. The mixing disk 10 has completely smooth surfaces. It is trapezoidal in cross section.

The drive of the mixing disk 10 is accomplished through a coupling 8 from a motor 15. Thereby the motor can be removed.

In the example of execution shown, the threads produced are to have cores, for example, of hemp or wire. These cores 16 are fed in the direction of the arrow, 11 through a gland 12 to the point of the gland and then go into the guide rods 13. On the front or downstream end of the guide rods there are stuffing boxes 14 which establish the communication with the mixing chamber 9. The cores are carried along by the forward-moving stream in the direction of the arrow 5 and pass then into tubular molds 17, where they harden at about the position indicated by the numeral 20. Previously the cores were coated with the highly fluid plastic. The cores, therefore, start out in uncoated condition and then run or are carried along along continuously by the flowing liquid starting materials in the guide tubes 13, and from pos. 20 onward, approximately, they are firmly joined with the plastic covering.

The coated threads then emerge from the molds 17 at pos. 22 and are conducted over a deflecting cape 23 to a guide apparatus, which is not represented in detail. They are there, for example, roped or processed further in another manner.

In order to reduce and control the temperature to a value which is about one-half of the melting temperature of the solid polymerized lactam, the molds 17 are surrounded by a cooling space 18, into which a suitable cooling agent enters through the line 19 and emerges through the line 21.

Figure 2:
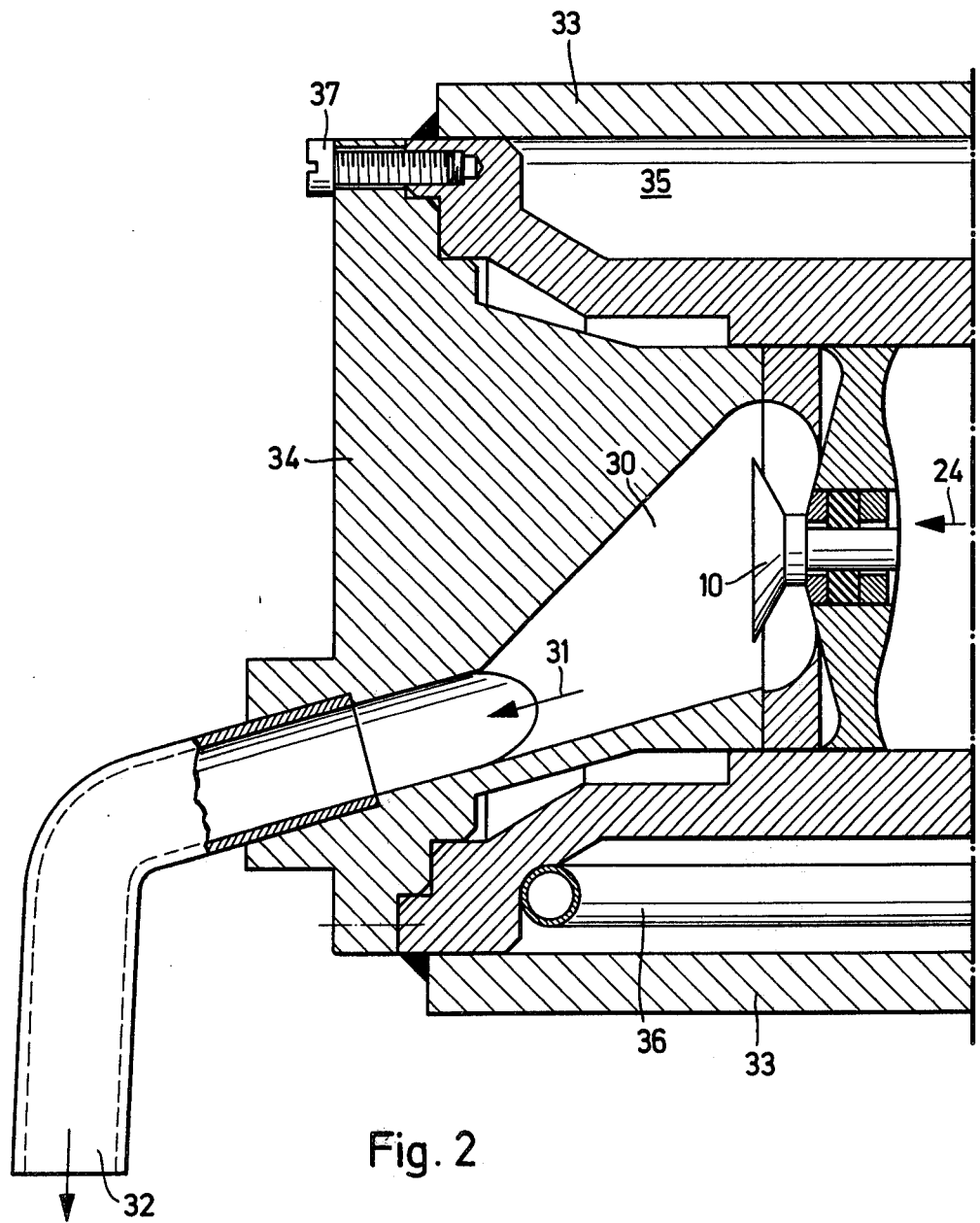
FIG. 2 is a cross-sectional view of the delivery end of an apparatus for the production of molded threads or strands of plastic without a central core.

In FIG. 2, corresponding entirely to the apparatus according to FIG. 1, the new-type plastic is supplied in the direction of the arrow 24 to the mixing chamber 30, and, namely, again in separate streams for the lactam monomer, the activator and the catalyst. The mixing chamber in this embodiment is inclined downward and likewise has smooth convolute surfaces on the upstream wall, surrounding the mixing disc 10. In the mixing chamber the material is mixed and calmed in its flow. It then flows in arrow direction 31, in free run to a pouring pipe 32, where it leaves the installation. The pouring pipe serves, for example, for filling molds for pipes, shaped parts and the like. According to the process of the invention, accordingly, there can be produced objects that are not necessarily elongated.

The mixing chamber 30 is surrounded by a shell 33, whereby there is formed an annular space 35 in which a heating medium can circulate, for example, inside the pipes 36. A cover 34 is removable by means of several screws 37 distributed on its circumference. Thereby the mixing chamber 30 is easily accessible and can easily be cleaned.

It is essential, accordingly that through the process and the apparatus according to the invention there can be produced virtually arbitrarily shaped objects of plastic with or without a core, with excellent material properties and long life.

I claim:

1. A method of continuously coating an elongated core with a plastic comprising:
    introducing said core into the bore of an elongated heated guide tube having an inside diameter greater than the outside diameter of said core;
    introducing said plastic in liquid condition into a heated mixing chamber in communication with and surrounding the exit end of said guide tube to cause intimate contact of said plastic with said core in heated condition;
    introducing a flowing stream of heated plastic containing said core from said mixing chamber into a mold tube having an elongated bore in substantial axial alignment with the bore of said guide tube;
    the velocity of said flowing stream of plastic and its frictional forces on said core being sufficient to convey and simultaneously center said core therein;

maintaining said mold tube at a temperature sufficient to initiate solidification of said plastic whereby to encapsulate said core with a solid plastic coating; and continuously recovering said plastic coated core.

2. A method of continuously coating an elongated core with a plastic comprising:

introducing a liquid polymerizable monomer of said plastic into a heated mixing zone communicating on one side with an elongated mold tube having a diameter greater than the diameter of said core to provide a flowing liquid stream of polymerizing monomer therein;

introducing said core into the bore of a heated guide tube communicating with said mixing chamber on its other side and extending coaxially with said mold tube;

maintaining said mixing zone at the polymerization temperature of said monomer with a residence time sufficient to initiate polymerization and intimately contact said plastic with said core;

introducing said core into said flowing liquid stream of polymerizing monomer the velocity of said stream and its frictional forces on said core being sufficient to convey and simultaneously center said core therethrough;

maintaining said mold tube at a temperature sufficient to complete the polymerization of said monomer; and continuously recovering said plastic coated core.

3. The method in accordance with claim 1 in which: said monomer is lauryl lactam; and an activator and catalyst therefore are introduced in admixture with said liquid lauryl lactam entering said mixing zone.

4. The method in accordance with claim 2 in which: said activator comprises phenyl isocyanate and said catalyst comprises carbon dioxide.

5. The method in accordance with claim 2 in which: said monomer is lauryl lactam; and an activator and catalyst therefore and said lauryl lactam are introduced as separate streams into said mixing zone.

6. The method in accordance with claim 5 in which: said activator comprises phenyl isocyanate and said catalyst comprises carbon dioxide.

7. An apparatus for continuously coating an elongated core including:

a housing member having an inlet end and an outlet end;

a mixing zone defined by said housing intermediate said inlet and outlet ends;

pump means for introducing liquid plastic into said mixing zone;

at least one guide tube supported within said housing having a bore with its inlet port in communication with said inlet end of said housing and its exit port in communication with said mixing zone;

at least one mold tube supported within said housing having its inlet port in communication with the outlet end of said housing;

said mixing zone having a volume larger than said guide and mold tubes and defined by a continuing wall having an off-center convolution about the exit port of said guide tube and a coaxial conical exit port converging into the inlet port of said mold tube; and heat transfer means for said housing member for heating said guide tube and cooling said mold tube;

whereby an elongated core having an outside diameter less than the inside diameters of said tubes is drawn through said guide tube and said mixing zone by the flow of plastic in said mold tube and is simultaneously coated with a plastic layer.

8. An apparatus in accordance with claim 7 in which:
a motor drive means is provided in the inlet end of said housing;

said motor drive means having a drive shaft extending in sealed relationship axially of said housing member and radially spaced from said guide tube into said mixing zone; and an impeller is provided on the end of said drive shaft to rotate within said mixing zone;

said impeller having a conical bevelled surface extending in the direction of flow of said liquid plastic whereby to create radially outward flow of said liquid plastic into said off-center convolution of said mixing zone to cause a decrease in the flow velocity therein.

9. An apparatus in accordance with claim 8 in which:
a plurality of substantially concentric and parallel spaced guide tubes is arranged around said impeller; and a plurality of substantially concentric parallel and spaced mold tubes is arranged in said outlet end of said housing.

10. An apparatus for continuously coating an elongated core including:

a housing member having an inlet and an outlet end;

a mixing zone defined by said housing intermediate said inlet and outlet ends;

pump means for introducing liquid plastic into said mixing zone;

at least one mold tube supported within said housing having its inlet port in communication with said mixing zone and an exit port in communication with the outlet end of said housing;

said mixing zone having a volume larger than said mold tube and defined by a continuous smooth wall having an off-center convolution opposed to the inlet port of said mold tube and a coaxial conical exit port converging into the inlet port of said mold tube; and heat transfer means for said housing member for heating said mixing zone and cooling said mold tube;

whereby an elongated core having an outside diameter less than the inside diameters of said tubes is coated with a plastic layer upon passage through said mixing zone and into the inlet port of said mold tube for recovery at said outlet end.

* * * * *